(12) United States Patent
Warsinger et al.

(10) Patent No.: US 10,441,921 B2
(45) Date of Patent: Oct. 15, 2019

(54) MAINTENANCE OF GAS LAYERS FOR FOULING PREVENTION ON SUBMERGED SURFACES

(71) Applicant: Massachusetts Institute of Technology, Cambridge, MA (US)

(72) Inventors: David Elan Martin Warsinger, Potomac, MD (US); Jaichander Swaminathan, Cambridge, MA (US); John H. Lienhard, Lexington, MA (US); Amelia Tepper Servi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 508 days.

(21) Appl. No.: 15/157,663

(22) Filed: May 18, 2016

(65) Prior Publication Data
US 2016/0339393 A1    Nov. 24, 2016

Related U.S. Application Data

(60) Provisional application No. 62/163,311, filed on May 18, 2015, provisional application No. 62/288,577, filed on Jan. 29, 2016.

(51) Int. Cl.
*B01D 65/02* (2006.01)
*B01D 65/08* (2006.01)
(Continued)

(52) U.S. Cl.
CPC ............. *B01D 65/02* (2013.01); *B01D 65/08* (2013.01); *B01D 67/0037* (2013.01);
(Continued)

(58) Field of Classification Search
CPC .......... B01D 2311/243; B01D 2321/04; B01D 2321/18; B01D 2325/06; B01D 2325/38;
(Continued)

(56) References Cited

U.S. PATENT DOCUMENTS 5,476,056 A     12/1995   Tokunaga et al.
5,643,455 A *   7/1997    Kopp ............... B01D 65/02
                                              210/321.69
(Continued)

FOREIGN PATENT DOCUMENTS

CA        2866082 A1    9/2013

OTHER PUBLICATIONS

D. Warsinger, et al., "Superhydrophobic condenser surfaces for air gap membrane distillation," 492 Journal of Membrane Science 578-587 (May 2015).
(Continued)

*Primary Examiner* — John Kim
(74) *Attorney, Agent, or Firm* — Modern Times Legal, Robert J. Sayre

(57) ABSTRACT

An apparatus for enhanced anti-fouling of a submerged surface includes a bath of a feed liquid that includes water; a fouling structure in contact with the feed liquid; and a gas feed configured to introduce a gas into contact with the fouling structure and the feed liquid to separate the fouling structure from the feed liquid with a gas layer.

22 Claims, 9 Drawing Sheets

(51) Int. Cl.
*B01D 67/00* (2006.01)
*B01D 71/32* (2006.01)
*B01D 61/36* (2006.01)
*B01D 53/22* (2006.01)

(52) U.S. Cl.
CPC ......... *B01D 67/0088* (2013.01); *B01D 71/32* (2013.01); *B01D 53/228* (2013.01); *B01D 61/364* (2013.01); *B01D 2311/243* (2013.01); *B01D 2321/04* (2013.01); *B01D 2321/18* (2013.01); *B01D 2325/06* (2013.01); *B01D 2325/38* (2013.01)

(58) Field of Classification Search
CPC .. B01D 53/228; B01D 61/364; B01D 61/368; B01D 65/02; B01D 65/08; B01D 67/0037; B01D 67/0088; B01D 71/32
See application file for complete search history.

(56) References Cited

U.S. PATENT DOCUMENTS

| | | | | |
|---|---|---|---|---|
| 2003/0075504 | A1* | 4/2003 | Zha | B01D 63/02 |
| | | | | 210/636 |
| 2003/0189006 | A1 | 10/2003 | Allen | |
| 2007/0084791 | A1* | 4/2007 | Jordan | B01D 61/145 |
| | | | | 210/608 |
| 2010/0000941 | A1* | 1/2010 | Muller | B01D 61/20 |
| | | | | 210/636 |
| 2010/0025320 | A1* | 2/2010 | Johnson | B01D 65/02 |
| | | | | 210/321.69 |
| 2014/0131263 | A1 | 5/2014 | Bachand | |
| 2014/0332467 | A1* | 11/2014 | Brummer | B01D 61/145 |
| | | | | 210/636 |

OTHER PUBLICATIONS

D. Warsinger, et al., "Scaling and fouling in membrane distillation for desalination applications: A review," 356 Desalination 249-313 (2014).

G. Chen, et al., "Performance enhancement and scaling control with gas bubbling in direct contact membrane distillation," 308 Desalination 47-55 (2013).

H. Zhang, et al., "Engineering nanoscale roughness on hydrophobic surface—preliminary assessment of fouling behaviour," 6 Science and Technology of Advanced Materials 236-239 (2005).

D. Warsinger, et al., "Combining air recharging and membrane superhydrophobicity for fouling prevention in membrane distillation", 505 J. of Membrane Science 241-252 (2016).

US Patent and Trademark Office, International Search Report and Written Opinion for PCT/US2016/033009 (corresponding PCT application), dated Aug. 19, 2016.

* cited by examiner

MAINTENANCE OF GAS LAYERS FOR FOULING PREVENTION ON SUBMERGED SURFACES

RELATED APPLICATION

This application claims the benefit of U.S. Provisional Application No. 62/163,311, filed 18 May 2015, and of U.S. Provisional Application No. 62/288,577, filed 29 Jan. 2016, the entire contents of both of which are incorporated herein by reference.

BACKGROUND

Membrane Distillation (MD) desalination has been sought for its unique advantages in fouling resistance and scalability to small system sizes. In previous studies of membrane distillation, the superhydrophobicity of the membrane has been shown to dramatically decrease fouling in adverse conditions, but the mechanism for this decrease has not been well understood. Fouling may also present a problem in other contexts, such as in heat exchangers.

Hydrophobic membranes are used for a wide range of applications, including membrane distillation, pervaporation, oil-water separation, venting gas from fluid channels, filtration, biological applications and water-proof textiles. Biological applications include medical diagnostics and blood type determination.

Hydrophobic membranes for these applications are typically fabricated from PTFE, PVDF, polyethylene or polypropylene. Fabrication methods include phase-inversion, electrospinning, sintering and stretching. Hydrophilic/hydrophobic hybrid membranes made from hydrophilic materials treated with fluoropolymers or other non-polar materials may also be used.

Many hydrophobic membrane processes depend on maintaining the resistance of the membrane to wetting. If wetting occurs, contamination, degradation of process quality and accuracy, and reduction in transmembrane flux often follow. A method and apparatus for restoring membrane hydrophobicity, particularly in the context of membrane distillation desalination, is described herein.

SUMMARY

Apparatus and methods for decreasing fouling of submerged surfaces or porous structures are described herein, where various embodiments of the apparatus and methods may include some or all of the elements, features and steps described below.

An apparatus for enhanced anti-fouling of a submerged surface includes the following components: a bath of a feed liquid that includes water; a fouling structure in contact with the feed liquid; and a gas feed configured to introduce a gas into contact with the fouling structure and the feed liquid to separate the fouling structure from the feed liquid with a gas layer.

In a method for reducing fouling of membrane surfaces, a surface of a fouling structure is contacted with a bath of feed liquid. A gas is then introduced into contact with the surface of the fouling structure in contact with the feed liquid.

The fouling structure can be a porous structure; and, particularly, the porous structures can be a porous polymeric membrane with a superhydrophobic surface (e.g., where the contact angles of a water droplet in contact with the "superhydrophobic" surface exceeds 150° and where the roll-off angle/contact angle hysteresis is less than 10°).

The gas can be injected (e.g., from a pressurized gas tank, a gas pump, and a piston) either into the feed liquid or on an opposite side of the membrane from the feed liquid with sufficient pressure to force the feed liquid out of the pores of the membrane. The gas can be injected intermittently or continuously.

In various embodiments, the present work studies the effect of gas (e.g., air, water vapor, nitrogen, $CO_2$, or oxygen) layers on a membrane surface with fouling of MD membranes by salts, particulates, and organic molecule. Superhydrophobic MD membranes were created by initiated chemical vapor deposition (iCVD) of perfluorodecyl acrylate (PFDA), an analog of PFDA, polytetraflouroethylene (or other composition that is more hydrophobic than the underlying membrane) to form coatings on membranes formed of polyvinylidene fluoride (PVDF) or polypropylene (PP). In other embodiments, the membrane can be formed of polytetrafluoroethylene (PTFE) with or without a coating. In additional embodiments, the coating can be applied by spray-coating, blended synthesis with polymers, and dip coating. In still other embodiments, the membrane is made hydrophobic by providing it with a surface having a rugosity greater than 3.

The effect of fouling is examined by using a petri dish MD-like setup with and without gas exposure, and by measuring the increase in weight of the membrane caused by scale deposition. The frequency of gas (air) recharging, the method of applying gas, and the salinity were analyzed. The study found that the presence of gas (air) on the membrane surface significantly reduces biological fouling.

The apparatus and methods described herein can also be used to prevent or reduce fouling in heat exchangers. Heat exchangers, in particular, have significant fouling issues (temperatures are very hot near heat exchangers, so salts with inverse solubility with temperature tend to crystallize). Additionally, heat exchanger surfaces typically are formed of metal; and metal is usually hydrophilic, making fouling worse.

The apparatus and methods can also be used to prevent or reduce fouling in oil and gas separation processes. Additionally, the apparatus and methods can also be used to prevent or reduce fouling in biological processes, such as diagnostic tests (e.g., immunochromatography); in in-line sterile barriers (e.g., transducer protectors, vacuum-line protectors, and gas analyzers); in liquid shutoff valves (e.g., suction canister vents); in air inlet valves (e.g., IV spike vents); in air vent valves (e.g., IV filter vents); in container filling vents (e.g., urine bag vents); in sterile wound dressings; in sterile vent barriers on packaging; in gas sterilization devices for insufflation and blood oxygenation; and in aerosol containment units for chemotherapy drug reconstitution. Additional discussion of the use of microporous hydrophobic membranes in medical device applications is provided in W. Goldberg, et al., "Design Solutions Using Microporous Hydrophobic Membranes," Medical Plastics and Biomaterials Magazine (March 1997).

The apparatus and methods can also be used to prevent or reduce fouling in filters (used, e.g., for microfiltration or ultrafiltration), clothing (e.g. Gore-Tex fabrics); and gasification processes (e.g., deliberately adding or removing gas from a liquid system).

BRIEF DESCRIPTION OF THE DRAWINGS

In the accompanying drawings, like reference characters refer to the same or similar parts throughout the different views. The drawings are not necessarily to scale; instead, emphasis is placed upon illustrating particular principles in the exemplifications discussed below.

DETAILED DESCRIPTION

Figure 1:
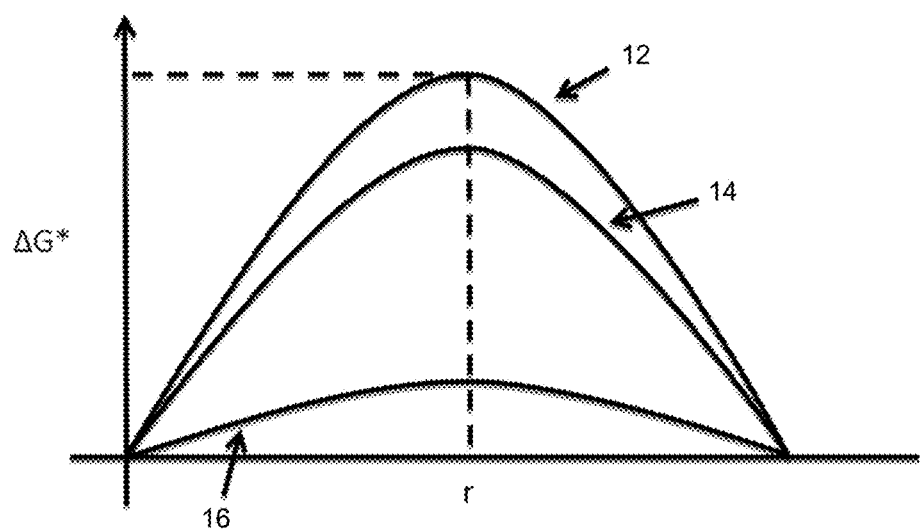
FIG. 1 is a plot of the Gibbs free energy barrier of formation, $\Delta G^*$, versus radius, r, for homogeneous nucleation ($\Delta G^*_{hom}$) 12, nucleation on a superhydrophobic microporous MD membrane ($\Delta G^*_{MD}$) 14, and heterogeneous nucleation ($\Delta G^*_{het}$) 16.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Scaling in Membrane Distillation

Membrane distillation is an emerging thermal desalination technology that relies on a hydrophobic membrane that passes water vapor but rejects liquid water, as described in D. Warsinger, et al., "Superhydrophobic condenser surfaces for air gap membrane distillation," 492 Journal of Membrane Science 578-587 (May 2015). Membrane distillation is known to be relatively resistant to scaling of salts compared to other water desalination processes, such as reverse osmosis (RO) [see D. Warsinger, et al., "Scaling and fouling in membrane distillation for desalination applications: A review," 356 Desalination 249-313 (2014)]. However, the mechanism for this resistance is poorly understood. The scaling of the membrane surface impairs membrane distillation (MD) performance by blocking the surface with scale, reducing the permeate flux, and causing wetting of the saline feed through the membrane, contaminating the permeate.

Past studies on superhydrophobic MD membranes have shown extreme resistance to scaling, which included a reduction in surface nucleation and particulate attachment. Additionally, past studies on MD that included filtration have also found that nucleation in the bulk feed fluid contributes significantly to MD fouling. Studies on submerged superhydrophobic surfaces have shown extreme resistance to biofouling.

Previous studies have shown bubbling of air in the MD feed could reduce fouling, which was largely done to reduce concentration polarization by increasing mixing [G. Chen, et al., "Performance enhancement and scaling control with gas bubbling in direct contact membrane distillation," 308 Desalination 47-55 (2013)], though those studies did not use superhydrophobic surfaces to create or hold air layers at the fouling surface. Because of the effectiveness of air layers and superhydrophobicity for fouling prevention of MD and other surfaces, and the desire to reduce wetting, the present inventors hypothesized that deliberately introducing gas into the system periodically could reduce fouling. It is thought that the gas layers may act as a barrier to particulate fouling, reducing the adhesion rate and reducing particle advection to the surface by physically blocking them. The periodic introduction of gas may allow wetted membrane sections to restore their hydrophobicity, reducing the risk of the feed contaminating the permeate.

For inorganic scaling to occur, the following two steps are involved: (a) first, crystals nucleate from the solution, followed by (b) crystal growth. Crystal growth on stable crystals is spontaneous in saturated solutions, so the key for avoiding crystallization is to extend the induction time before nucleation occurs. The degree of saturation is measured by the saturation index (SI), which is a log scale of saturation, where 0 is saturated and 1 is 10 times the saturation concentration.

In desalination systems employing membrane distillation, several types of scale dominate. Calcium scale, including calcium sulfate and calcium carbonate, is among the least soluble and most problematic inorganic scale in seawater and various groundwater sources. For systems that experience regular dryout, such as remote solar thermal desalination systems, significant sodium chloride is often left behind after evaporation because it is present in such high levels in most waters. Finally, in seawater applications, the remains of algae often cause biological fouling; the polysaccharide alginate is often used to study algae fouling. Alginate can form a gel layer on membrane surfaces that causes significant diffusion resistance.

The fouling membrane can be formed of, e.g., a polymer, such as polyethylene, polyvinylchloride, polymethylmethacrylate, polyvinylidene fluoride, polyester, polyurethane, polyanhydride, polyorthoester, polyacrylonitrile, polyphenazine, polyisoprene, synthetic rubber, polytetrfluoroethylene, polyethylene terephthalate, acrylate polymer, chlorinated rubber, fluoropolymer (e.g., polytetrafluoroethylene), polyamide resin, vinyl resin, expanded polytetrafluoroethylene, low density polyethylene, high density polyethylene, and/or polypropylene.

These different foulants, NaCl, $CaSO_4$, silica, and alginate were all tested in a beaker-based MD setup with different methods of air exposure. In other embodiments, the foulant can include $CaCO_3$, MgOH, bacteria, algae, humic acid, and/or biological molecules. Lifting the membrane horizontally and vertically, as well as the introduction of saturated bubbles, was introduced to either regular hydrophobic or coated superhydrophobic MD membranes. Membrane superhydrophobicity can be created by either of—or a combination of—hydrophobic compounds and increased surface roughness.

Figure 2:
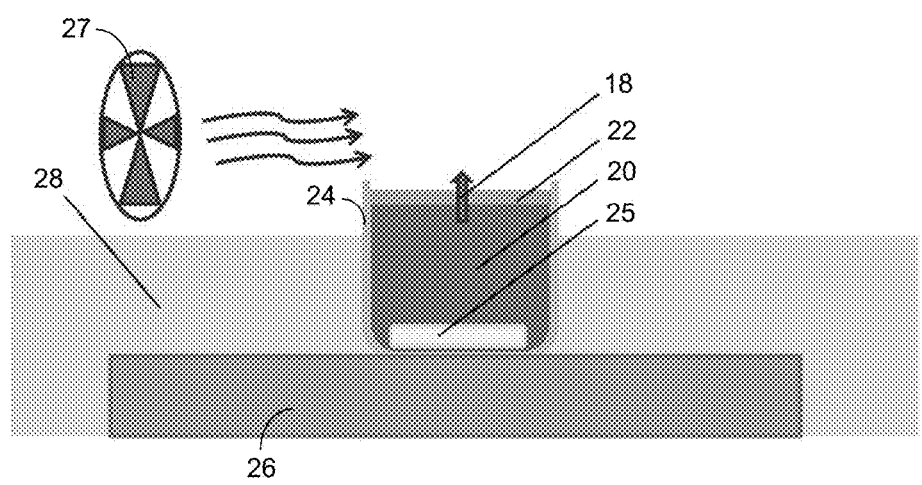
FIG. 2 is an illustration of an experimental setup of evaporation (via vapor diffusion, shown via arrow 18) from a saline solution 20 and scaling through an MD membrane 22.

The introduction of gas layers can be carried out in several ways. For the membrane, the gas can be introduced from the feed side (into the saline solution) or from the condensate side (above the membrane, as shown in FIG. 2). The gas passing by the membrane can be in the form of bubbles in solution, or the feed channel can be emptied to make most of the entire region gas.

In one embodiment, gas is injected into the water at a pressure higher than that of the water. This high gas pressure ensures that the water cannot enter into the gas source, flooding it. Increased gas pressure can be induced by an air pump, a high pressure tank, or a water column.

The pressure can be increased in the region with the gas to force gas through the membrane. This force-through of the gas may remove fouling and ensure that the membrane is minimally wetted. The reduced wetting reduces the contact area of the wall and liquid, thus reducing fouling.

Introducing gas at higher pressure on the condensate (gap) side of the membrane also has several additional benefits. It may push water out of the membrane via backwashing, thus removing water and salt from the membrane pores. Pushing the gas through the membrane also can reverse membrane wetting, which is the common mode of failure for MD, by pushing out the liquid and salts that have managed to enter the membrane and ending pinning of liquid inside the membrane. Thus, this practice restores the membrane to a state filled with vapor and/or air or other gas, not liquid.

System monitoring can be performed that may determine the frequency of introducing gas layers. Once performance decays (as detected by, e.g., a measurement of electrical conductivity through the feed liquid, a mass flow rate measurement in the apparatus, and a temperature reading in the apparatus), gas may be intermittently injected into the system. There are several methods for performing monitoring. A conductivity measurement of the condensate can indicate wetting. A mass flow rate measurement of condensate can indicate significant foulant build up on the membrane surface, which can then be flushed. Mass flow rate or temperature readings can indicate the size of the air layer, as the air layer will act to reduce the heat and mass transfer through the system. Once the inferred size of the air layer approaches a minimum value, gas may be added. The system can also be measured optically.

Gas layers can act to prevent fouling on a variety of surfaces, including membranes, boat or submarine hulls, heat exchangers, and other submerged surfaces. Gas can be introduced to the surface of any of these systems by, for example, bubbling or floating up to coat it. To do so naturally, the air is introduced at a lower elevation if buoyancy is what drives the air to flow over the surface. In one embodiment, holes along a boat hull periodically open to release pressurized water.

The addition of gas layers may be especially helpful when combined with other cleaning processes. For instance, some cleaning agents, such as chlorine, are harmful to membranes, so introducing gas before or during a cleaning process can reduce membrane or surface damage.

The rate of scale deposition by mass was used to examine the effect of gas recharging on reducing fouling on different types of MD membranes.

Fouling and Nucleation Kinetics

The physical behavior of the types of foulants that may occur were explored to predict and explain fouling phenomena.

If particles deposit on the membrane, either from biological fouling, particulate fouling, or bulk nucleation, then the flux of particles to the surface can be modeled as follows, which was previously applied for particulate deposition on reverse osmosis (RO) membranes:

$$\frac{d\delta_c}{dt} = \alpha \delta_c v_p \varnothing_x \quad (1)$$

Where $\varnothing_x$ is the salt concentration, $\delta_c$ is the fouling layer average thickness, and $\alpha$ is called the "foulant sticking efficiency."

The gas layer may alter deposition in two ways: first, a thick gas layer may physically block solid particles, since they are not volatile, thus causing $v_p$ to approach zero. Second, the reduction of the depth of wetting into the surface may reduce the likelihood of particles advection to the surface to stick, thus reducing the foulant sticking efficiency, $\alpha$.

Previous studies have examined the Gibbs energy of formation, $\Delta G^*$, on membrane distillation surfaces as a function of the membrane-water static contact angle, $\theta$. This formation energy is given as follows:

$$\frac{\Delta G^*_{heterogeneous}}{\Delta G^*_{homogeneous}} = \frac{1}{4}(2+\cos\theta)(1-\cos\theta)^2\left(1-\varepsilon\frac{[1+\cos\theta]^2}{[1-\cos\theta]^2}\right)^3 \quad (2)$$

Where $\varepsilon$ is the porosity. Consequently, heterogeneous nucleation is favorable. FIG. 1 shows the approximate Gibbs free energy barrier for homogeneous nucleation, nucleation on the superhydrophobic membranes used, and heterogeneous nucleation.

This means that for more-hydrophobic surfaces, the Gibbs free energy required to nucleate on the membrane surface is higher and approaches that required by the relatively rare homogeneous nucleation. Physically, this means that MD membranes are unfavorable for surface nucleation. Heterogeneous nucleation, however, is much more favorable and can occur with small foreign particles in the feed, other surfaces, and gas bubbles. The nucleation induction time is exponentially dependent on the Gibbs free energy barrier; small differences in this barrier can make nucleation much more rapid. The gas-water interface can induce heterogeneous nucleation, which is expected because of the lower energy barrier. As a result, the presence of air or any other surfaces or colloids may cause heterogeneous nucleation, which may foul MD systems in conditions where the induction time of the membrane and homogeneous nucleation would otherwise be long enough to avoid fouling.

Methodology

Membrane Distillation Set-Up

A petri-dish-like MD setup was created to analyze the effect of introducing gas layers to reduce fouling. This simple set up lacks water recovery like a full MD system; instead, it simply analyzes the effect of gas layers on an MD membrane that separates a hot (e.g., 40° C. to 100° C.) well-mixed saline solution from turbulent dry air. This design allows for typical MD conditions on the feed side, which is the only part studied here, while allowing for rapid results and more precise weights of foulants.

In the setup, as shown in FIG. 2, the MD membrane 22 rests on the surface of saline water 20 in a tall petri dish 24. A stirrer 25 keeps the solution well mixed, and a hot plate 26 with temperature controls keeps the solution at a constant temperature. A fan 27 situated one meter away from the apparatus blows arid air over the system. Fouling was observed by weighing the membrane 22 before and after running the experiment. After the experiment, the weight of the membrane 22 was measured twice to account for water remaining on the membrane 22. The first weight measurement was taken a few seconds after the experiment to weigh water left clinging to the membrane 22; and, the membrane 22 was weighted again, a few hours later to measure its dry weight. The three weights were then compared, using the concentration of the water at the membrane surface, to determine how much salt precipitated onto the membrane 22.

The experiment took place under a fume hood with consistent conditions. A humidity meter was placed inside the fume hood, and a small thermocouple temperature probe was periodically used to ensure that the temperature gradients within the liquid 20 remained consistent. The hot plate 26 was well-insulated by an insulation layer 28 so that the hot plate 26 would not significantly warm up the air from the fan 27.

Figure 3:
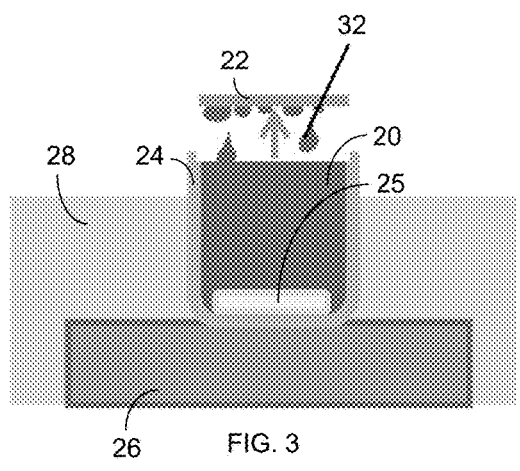
FIG. 3 shows a method for gas recharging via horizontal-lifting gas exposure, with an illustration of falling condensate (e.g., water) droplets 32.
Figure 4:
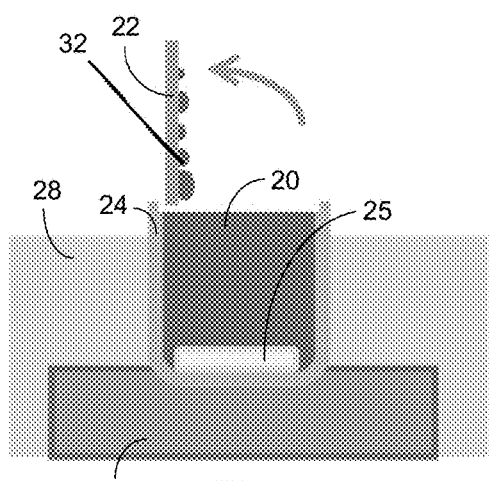
FIG. 4 shows a method for gas recharging via vertical-lifting gas exposure.
Figure 5:
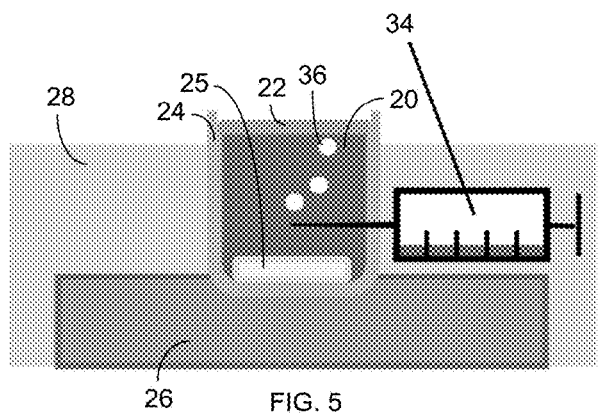
FIG. 5 shows a method for gas recharging via injection of air bubbles from a syringe 34.

As shown in FIGS. 3-5, several different methods of gas recharging were tried. Specifically, horizontal-lifting gas exposure is shown in FIG. 3, while vertical-lifting gas exposure is shown in FIG. 4. In yet another embodiment, gas injection via a syringe 34 is shown in FIG. 5. The use of different methods of gas recharging ensured that effects outside the scope of study did not affect the result, such as the evaporation of vapor during gas recharging. In the lifting methods of FIGS. 3 and 4, the membrane 22 is gently lifted vertically, and the saline water rolls off the hydrophobic surface as droplets 32 back into the solution 20. For the syringe method of FIG. 5, saturated gas bubbles 36 were injected periodically (5 mL per injection) near the center of the device.

The gas recharging was done by periodically lifting the membrane 22 for a specific gas recharging duration and frequency. A lift time of 10 seconds was used, as this period was sufficient for most of the water to drain off due to gravity, but not so long such that significant evaporation would occur on the membrane surface. A variety of configurations and lifting frequencies were examined to determine which was the most effective. A horizontal-lift position, as shown in FIG. 3, means that the membrane 22 was lifted without any tilting, whereas a vertical-lifting configuration, as shown in FIG. 4, rotated the membrane 90°. Lifting was done with tweezers, with small lift points cut into the original membrane 22, ~0.5 mm×0.5 mm.

The experimental conditions for gas recharging of the MD membrane 22 in all of the performed trials are provided in the following table:

TABLE 1

| Trial | Foulant | Lifting Frequency [min] | Gas recharging | Trial 1 | Trial 2 | Trial 3 | Trial 4 |
|---|---|---|---|---|---|---|---|
| A | 20% NaCl | 10 | horizontal lifting | hydrophobic, control | hydrophobic, lifting | super-hydrophobic, control | super-hydrophobic, lifting |
| B | 20% NaCl | 5 | vertical lifting | hydrophobic, control | hydrophobic, lifting | super-hydrophobic, control | super-hydrophobic, lifting |
| C | 25% NaCl | 10 | vertical lifting | hydrophobic, control | hydrophobic, lifting | | |
| D | 30% NaCl | 10 | vertical lifting | hydrophobic, control | hydrophobic, lifting | super-hydrophobic, control | super-hydrophobic, lifting |
| E | 0.58% CaSO$_4$ | 10 | syringe | hydrophobic, control | hydrophobic, lifting | super-hydrophobic, control | super-hydrophobic, lifting |
| F | Silica | 10 | syringe | hydrophobic, control | hydrophobic, lifting | super-hydrophobic, control | super-hydrophobic, lifting |
| G | 0.04% Alginate | 10 | syringe | hydrophobic, control | hydrophobic, lifting | super-hydrophobic, control | super-hydrophobic, lifting |

In the above trials, the following experimental variable values were used:

TABLE 2

| Variables | Symbol | Experiment Values | Control |
|---|---|---|---|
| temperature | $T_{f,in}$ | 60° C. | ±3° C. |
| humidity | $m_{f,in}$ | 0.25 kg/s | ±5% |
| condensate flux | $m_p$ | 5 LMH | ±0.5 LMH |
| stirrer rotation | $\omega$ | 60 rpm | ±1 rpm |
| membrane area | A | 19.63 cm$^2$ | — |

Membrane Preparation

The hydrophobic membranes were commercial polyvinylidene fluoride (PVDF) membranes (specifically, Millipore Immobilon-PSQ, 0.2 μm pore size membrane, part # ISEQ 000 10). The superhydrophobic membranes were prepared using the same PVDF membranes treated with a conformal coating of poly-(1H,1H,2H,2H-perfluorodecyl acrylate (PPFDA). The coating was produced using initiated chemical vapor deposition (iCVD). iCVD of the PPFDA was conducted using a custom-built reactor using a process described previously in A. M. Coclite, et al., "25th anniversary article: Cvd polymers: A new paradigm for surface modification and device fabrication," 25 Advanced Materials 5392-5423 (2013). iCVD of PPFDA has been previously used to create hydrophobic, conformal coatings on membranes.

In other embodiments, a fluoropolymer selected from those identified in WO2014127304 A1 can be used in place of PPFDA, such as polytetrafluoroethylene, [C$_{i2}$H$_9$Fi$_3$O$_2$]$_n$, a C6 analog of PFDA, poly(2-(Perfluoro-3-methylbutyl)ethyl methacrylate), or any copolymer comprising 2-(Perfluoro-3-methylbutyl)ethyl methacrylate, wherein the fluoropolymer is crosslinked, or a member selected from the group consisting of poly(3,3,4,4,5,5,6,6,7,7,8,8-tridecafluorooctyl methacrylate), poly(1H, 1H, 2H, 2H-perfluorooctyl acrylate), poly([N-methyl-perfluorohexane-1-sulfonamide] ethyl acrylate), poly([N-methyl-perfluorohexane-1-sulfonamide] ethyl (meth) acrylate), poly(2-(Perfluoro-3-methylbutyl) ethyl methacrylate)), poly(2-[[[[2-(perfluorohexyl)ethyl]sulfonyl]methyl]-amino]ethyl]acrylate), poly(2-[[[[2-(perfluoroheptyl)ethyl]sulfonyl]methyl]-amino]ethyl]acrylate), poly(2-[[[[2-(perfluorooctyl)ethyl]sulfonyl]methyl]-amino]ethyl]acrylate), and any copolymer thereof.

PFDA monomer (97% Sigma-Aldrich) and t-butyl peroxide initiator (TBPO) (98% Sigma-Aldrich) were used without further purification. The monomer was heated to 80° C. and fed into the chamber at a rate of 0.03 sccm. The initiator was kept at room temperature and was fed into the chamber at a rate of 1.0 sccm. The total pressure in the chamber was maintained at 45 mTorr throughout the deposition using a mechanical pump (45 CFM pumping speed, Alcatel). The reactor was equipped with an array of 14 parallel filaments (80% Ni, 20% Cr) resistively heated to 210° C. The membranes were placed on a stage that was maintained at 30° C. using a recirculating chiller/heater (NESLAB). A 200 nm thick PFDA film was deposited, after which, the filaments were turned off and deposition was halted. The deposition rate was 1.8 nm/min.

The presence of the iCVD film was verified by observing the change in contact angle of water on the membrane surface before and after iCVD coating. Contact angles were measured using a goniometer equipped with an automatic dispenser (model 590, Ramé-Hart Instrument Co. of Succasunna, N.J., US). DropImage software (also from Ramé-Hart) was used to acquire images for measurement. A 3-μL drop of room-temperature deionized water was first placed onto the membrane surface. The contact angle of the drop on the surface was measured at this time to determine the static contact angle. Water was then added to this drop in increments of 2 μL, and the angle between the advancing drop and the membrane surface was measured one second after each addition. The maximum of these measured angles was considered the advancing contact angle. The receding contact angle was measured by removing 2 μL of water at a time from the drop and measuring the angle between the receding drop and the surface one second after each removal. The lowest value observed was the receding contact angle. Measurements on at least five locations on each membrane were taken and averaged.

Air permeability of the membranes before and after application of the iCVD coating was measured to verify conformity of the coatings. Air permeability was measured using a custom setup. A syringe-pump (PHD 22/2000, Harvard Apparatus) was used to push room-temperature air through a membrane held in a membrane holder (GE Healthcare Biosciences) at a rate of 210 mL/min. While the air was being pushed through the membrane, the pressure difference across the membrane was monitored using a USB pressure transducer with a precision of +/−0.03 kPa (PX409, Omega). This pressure difference was used to calculate the permeability to air of the membranes.

The conformity of the coatings was also verified using scanning electron microscope (SEM) images (JEOL 6010a). SEM was also used to verify the presence of scaling after the tests.

Results and Discussion
Membrane Verification

The effect of the PPFDA coating on the PVDF membranes was determined by measuring contact angles and gas permeability (as indicated in Tables 3 and 4, below) and taking SEM images of the membranes before and after coating. As expected, the PPFDA coating increased the hydrophobicity of the membranes (Table 4, below); advancing and static contact angles increased from hydrophobic to superhydrophobic (increases of 11° and 22° respectively). The receding contact angle had the most significant increase, transforming from hydrophilic to hydrophobic (an increase of 78°). These results were more dramatic than expected considering that both PVDF and PPFDA are fluorinated polymers. PPFDA, however, has a higher concentration of fluorine than PVDF, which likely increases its static and advancing contact angles. Its side chains also form a semi-crystalline structure, which prevents the fluorine atoms from orienting away from water after contact. This feature may explain why the PPFDA-coated membranes (labeled as "superhydrophic" in Tables 3 and 4) have hydrophobic receding contact angles unlike the uncoated PVDF membranes. For both membranes, the contact angles measured on the membranes are affected by the roughness of the surface and are significantly higher than they would be if measured on a flat surface.

TABLE 3

| Membrane | # Trials | Standard deviation | | |
|---|---|---|---|---|
| | | Static contact angle (°) | Advancing contact angle (°) | Receding** contact angle (°) |
| Superhydrophobic | 4 | 4.39801 | 2.894823 | 2.124461 |
| Uncoated | 5 | 8.10728 | 11.862209 | 8.193107 |

TABLE 4

| Membrane | Permeability (kg/m2-Pa-s) | Advancing contact angle (°) | Static contact angle (°) | Receding** contact angle (°) |
|---|---|---|---|---|
| Superhydrophobic | 2.96E−06 | 156 | 157 | 134 |
| Uncoated | 3.19E−06 | 145 | 125 | 56 |

Figure 6:
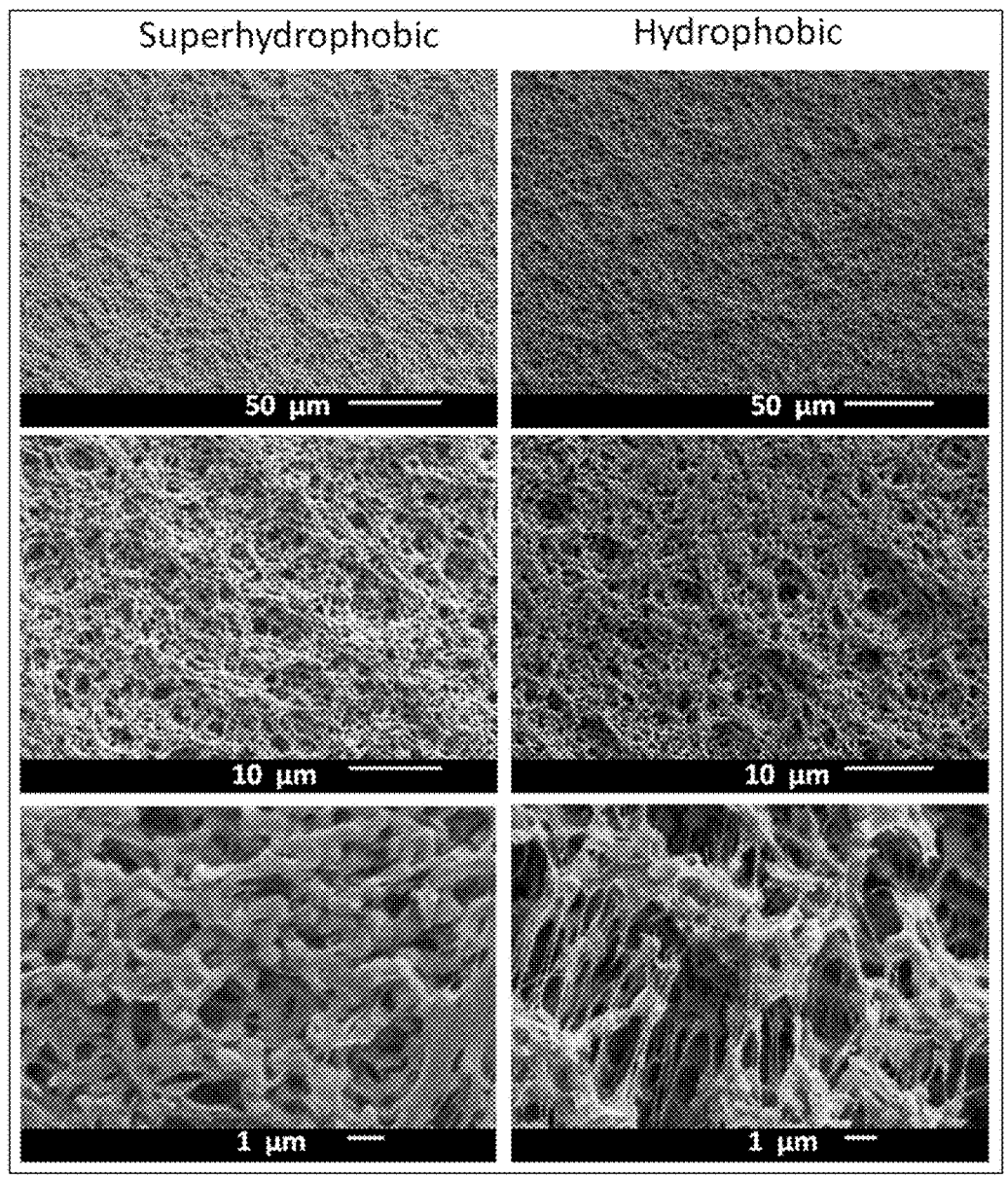
FIG. 6 shows scanning electron microscope (SEM) images of MD membrane surfaces, showing that the coating of poly-(1H,1H,2H,2H-perfluorodecyl acrylate) (PPFDA) deposited by iCVD on the membranes does not significantly decrease porosity and does not drastically change the membrane surface structure.
Figure 7:
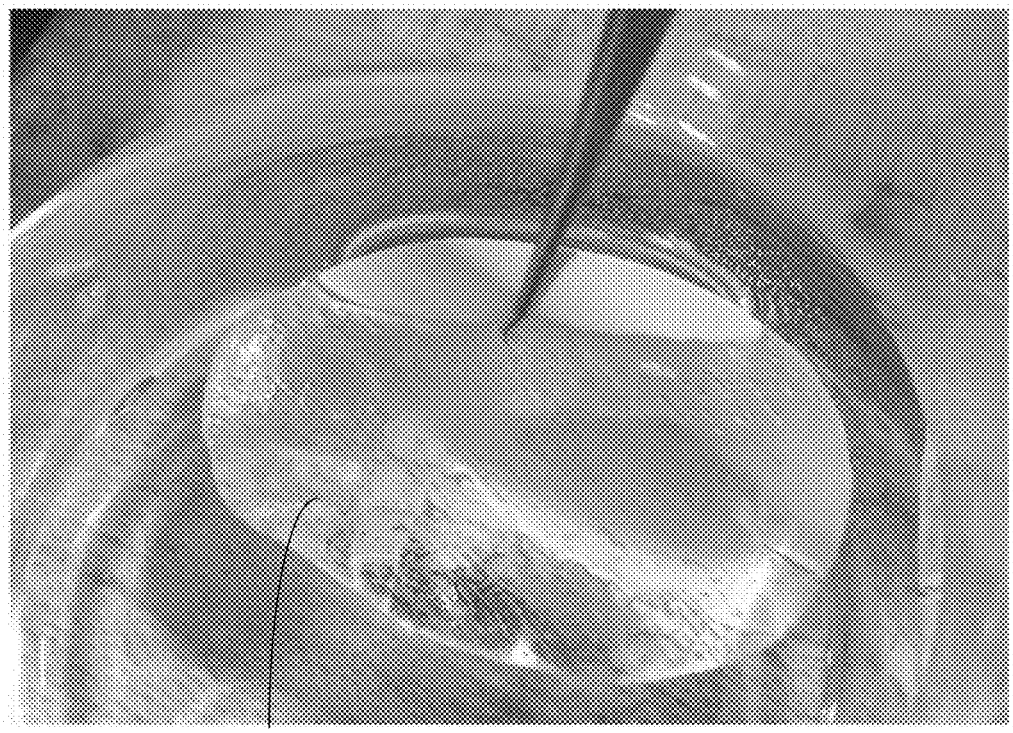
FIG. 7 is a photographic image of a submerged superhydrophobic MD membrane 22, visibly shiny due to the thin air layer on its surface.

The conformity of the coatings was verified by measuring permeability to air (Table 4) and taking SEM images of the membranes before and after coating (FIG. 6). The minor change in permeability (<7.5%) suggests that the coating did not significantly alter the pore structure of the membranes. In addition, SEM images before and after coating do not show a visible decrease in porosity. The hydrophobicity of the membranes after iCVD coating was also further illustrated by observation of an air layer on the membrane 22 during submersion in water (FIG. 7).

Scaling Results

Figure 8:
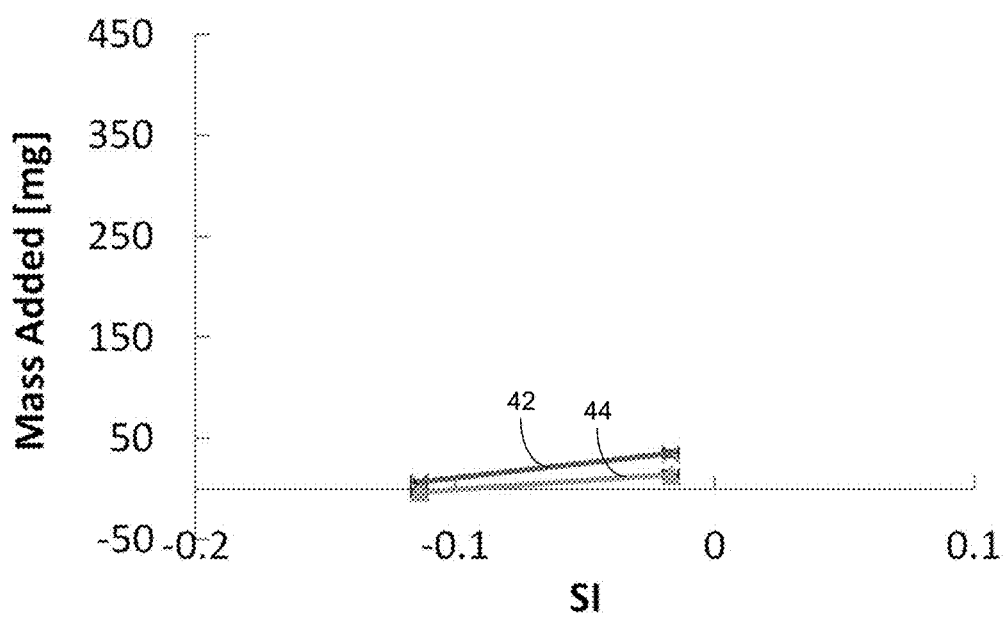
FIG. 8 is a plot of saturation index (SI) versus mass added for a superhydrophobic membrane with 42 and without 44 air recharge via horizontal-lifting gas exposure.
Figure 9:
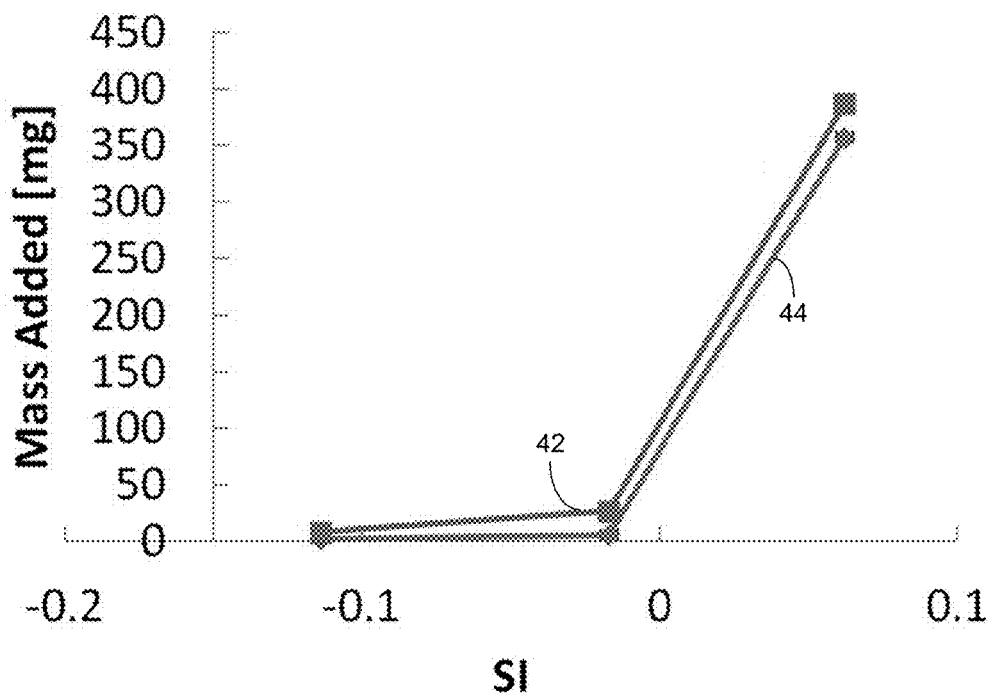
FIG. 9 is a plot of saturation index (SI) versus mass added for a hydrophobic membrane with 42 and without 44 air recharge via horizontal-lifting gas exposure.

The effectiveness of the gas recharging and membrane superhydrophobicity were measured by the mass of salt adhered to the membrane after the experiment. The saturation index (SI) versus mass added for a superhydrophobic, horizontal membrane with 42 and without 44 air recharge is plotted in FIG. 8. The saturation index (SI) versus mass added for a hydrophobic, horizontal membrane is plotted in FIG. 9, also with 42 and without 44 air recharge. The weight of salt adhered from operation 48 and dryout 46 to a petri dish MD membrane with a 20% NaCl solution is plotted for hydrophobic (H) and superhydrophic (Super H) membranes with gas lifting (air) and without gas lifting (none) is plotted in FIG. 10. The weight of salt adhered from operation 48 and dryout 46 to a petri dish MD membrane with a 25% NaCl solution is plotted for hydrophobic (H) and superhydrophic (Super H) membranes with gas lifting (air) and without gas lifting (none) in FIG. 11.

In the case of NaCl scaling, the gas recharging trials consistently had more salt adhered to the membrane. Due to the high concentration of NaCl, water left on the membrane contained a significant quantity of salt, causing a large amount of salt from dryout 46 of the membrane and increasing the overall error. Between the different methods of adding in gas, including vertical and horizontal lifting as well as use of the syringe, these trends were consistent.

Notably, the total salt adherence for the trials with added gas had similar masses added, regardless of the membrane used. This result may support the occurrence of bulk precipitation away from the membrane, itself, to be dominant over membrane scaling. This occurrence aligns with the expected thermodynamics of MD systems with added gas, where scaling on the hydrophobic membrane is relatively unfavorable but heterogeneous scaling at the gas-liquid interface is significant.

Figure 12:
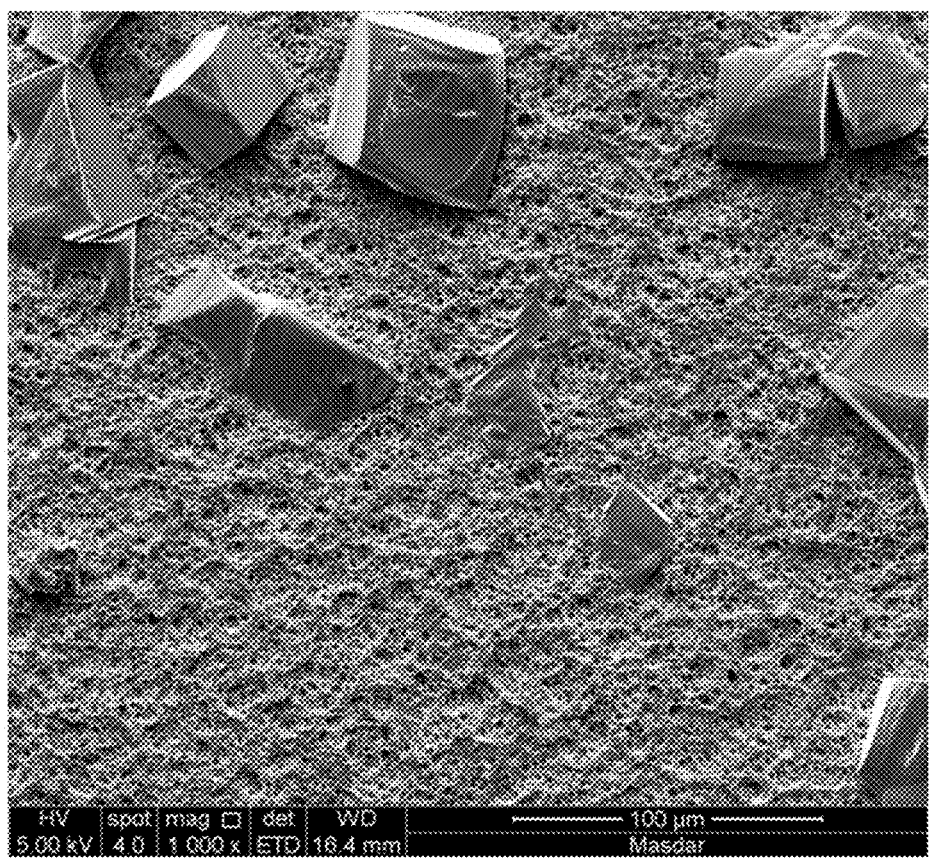
FIGS. 12 and 13 are SEM images of a superhydrophobic PVDF membrane after air recharging, in a solution with 30% NaCl, with vertical lifting.
Figure 13:
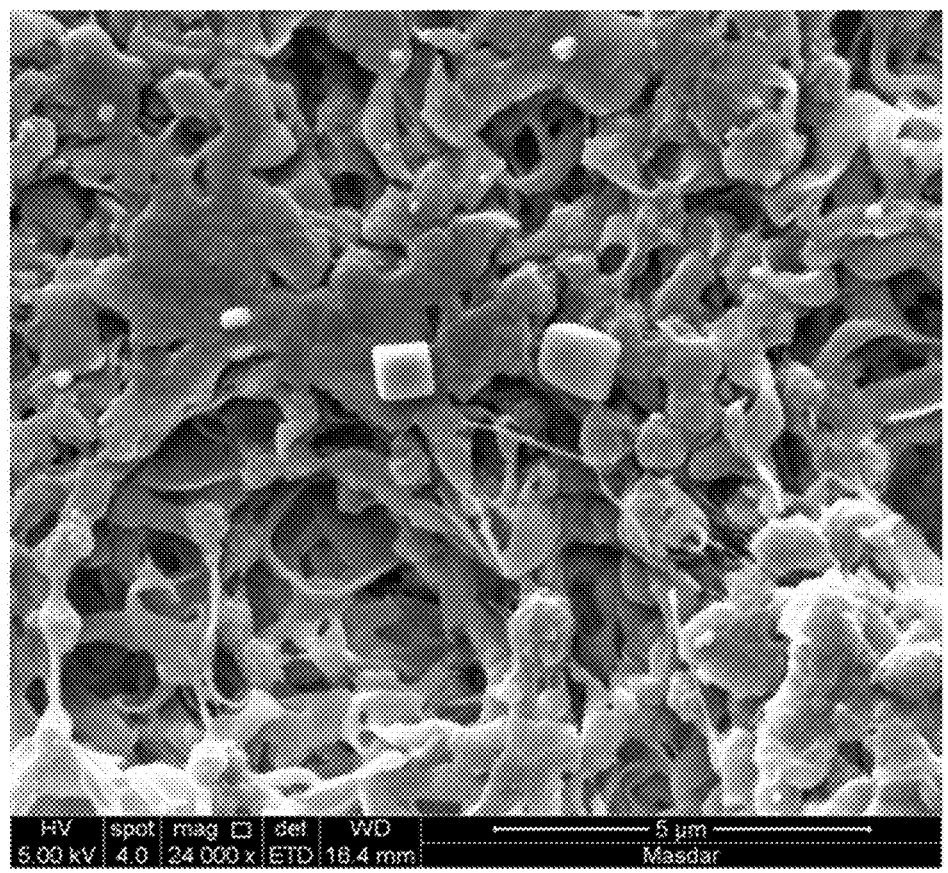

Scanning electron microscopy (SEM) was performed, as well, for select cases. SEM images of the superhydrophobic PVDF membrane after air recharging, in a solution with 30% NaCl, with vertical lifting are provided in FIG. 12 (where the scale indicator at lower right is 100 μm) and in FIG. 13 (where the scale indicator at lower right is 5 μm). Evaporation into the air may leave salt crystals behind, but this can be avoided if the air is supersaturated and at a temperature at least as high as that of the feed solution. The salt deposition was compared between the brief 10-second lifting periods and with the syringe containing hot saturated air. Both trials found that the air addition to NaCl exacerbated scale deposition, and confirmation experiments and partial trials confirmed that result. The salt deposition was reduced with the hot saturated air but did not appear dominant.

Figure 14:
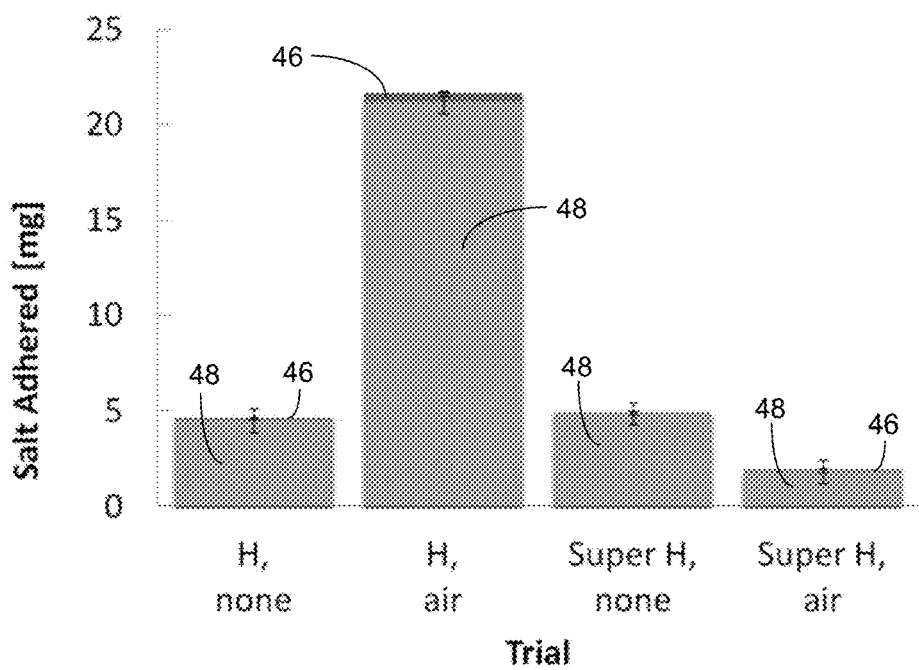
FIG. 14 is a plot indicating weight of salt (including salt from dryout 46 and salt from operation 48) adhered to a petri dish MD membrane with $CaSO_4$ exposure.

For the $CaSO_4$ trials, the introduction of air had a varied effect, as shown in FIG. 14. The trials without air recharging (none) did not vary substantially from one another, while the superhydrophobic (Super H) trials did demonstrate substantial variance. The superhydrophobic (Super H) membrane had a vast performance improvement over the hydrophobic (H) membrane. The superhydrophobic (Super H) membranes were able to sustain substantially more air, and the insulating effect of this layer seems to have won out in this case. Meanwhile, as in the NaCl experiments, the introduction of air caused heterogeneous nucleation at the interface, increasing the salt adherence in the hydrophobic (H) case.

Figure 15:
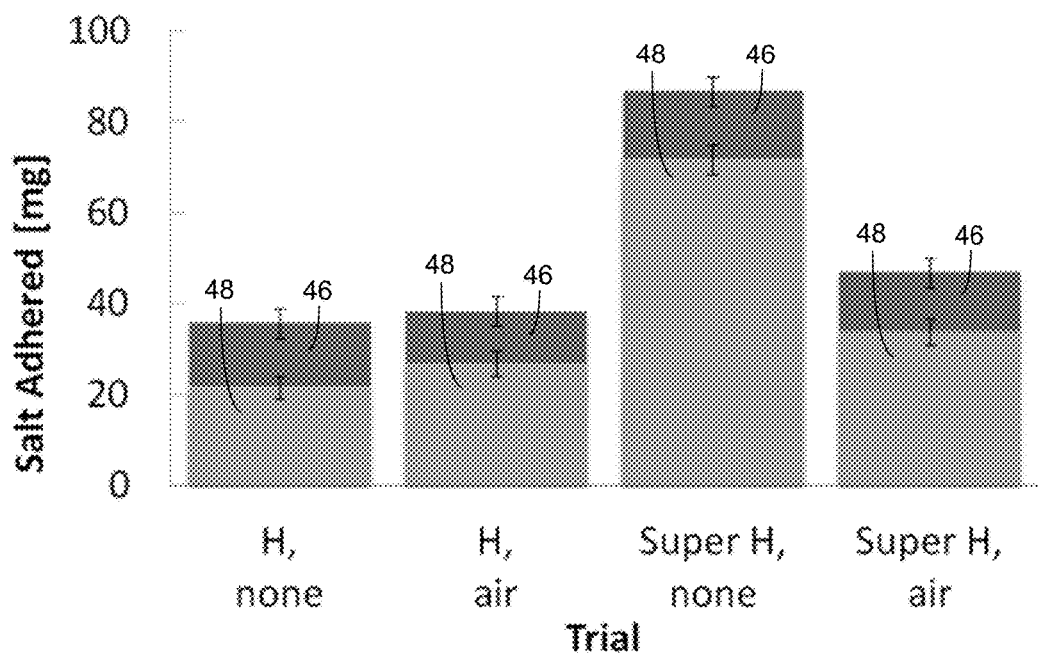
FIG. 15 is a plot indicating weight of salt (including salt from dryout 46 and salt from operation 48) adhered to a petri dish MD membrane with silica exposure.
Figure 16:
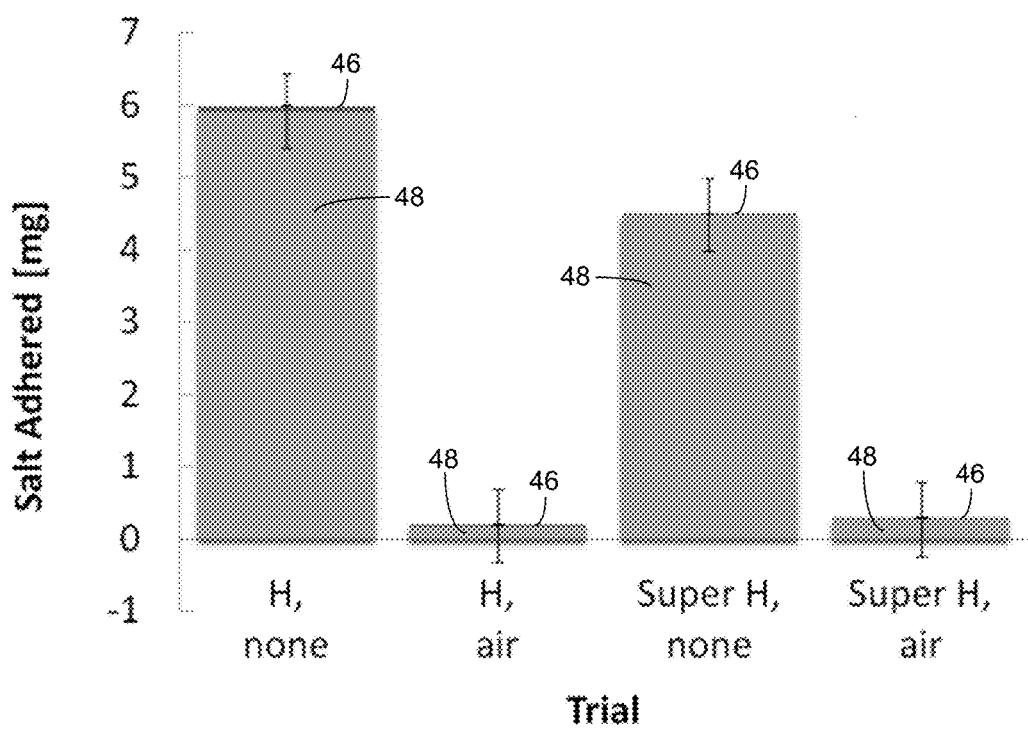
FIG. 16 is a plot indicating weight of salt (including salt from dryout 46 and salt from operation 48) adhered to a petri dish MD membrane with 0.04% alginate and $CaCl_2$ exposure.

Meanwhile, the weight of salt adhered (from operation 48 and dryout 46) to a petri dish MD membrane with a silica ($SiO_2$) foulant is plotted in FIG. 15 and with 0.04% alginate and $CaCl_2$ foulant is plotted in FIG. 16. As shown in FIG. 16, the introduction and maintenance of air layers (air) on the membrane surface caused a profound and consistent reduction in biofouling of alginate, as is evident in the low weights of adhered salt with both the hydrophobic (H) and superhydrophobic (Super H) membranes. Alginate, which forms a gel in the presence of calcium, does not follow classical crystalline nucleation. These large molecules are already colloids and so do not have a prolonged induction time like scaling salts; given sufficient minimum concentration, gels form in a matter of seconds. Therefore, the air layers inducing nucleation wasn't a factor. The air layers were thus able to reduce the contact area and adherence of the gel, substantially reducing fouling. This result shows that air layers may be helpful in reducing biofouling in MD, where biofouling is particularly harmful, since the hydrophobicity of MD membranes tends to make them oleophilic.

CONCLUSION

Figure 10:
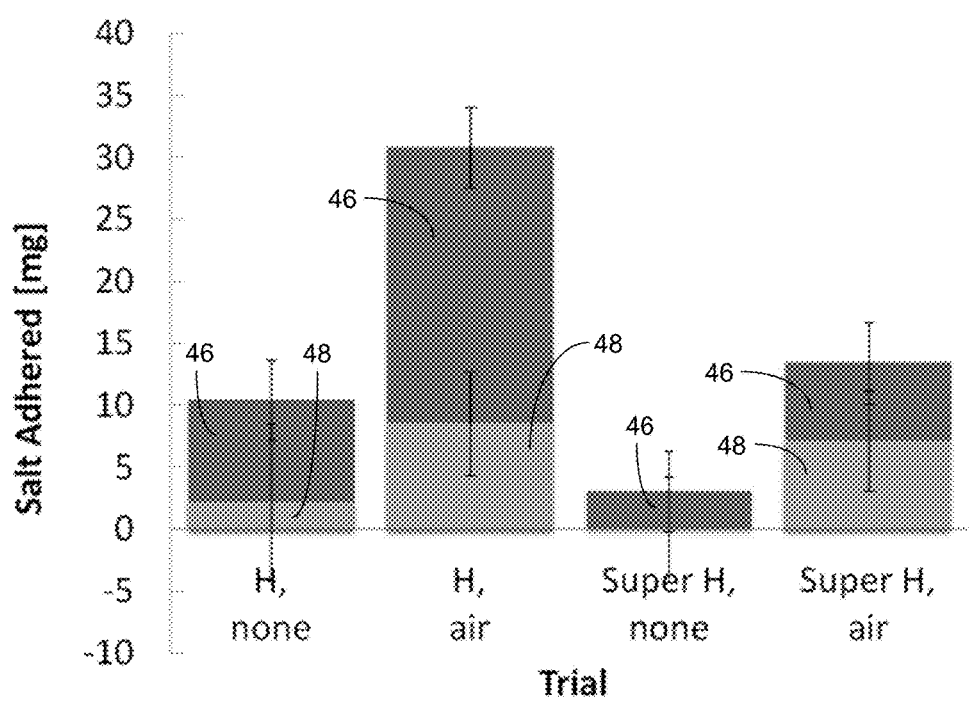
FIG. 10 is a plot of the weight of salt adhered to a petri dish MD membrane with 20% NaCl exposure, including salt from dryout 46 and salt from operation 48.
Figure 11:
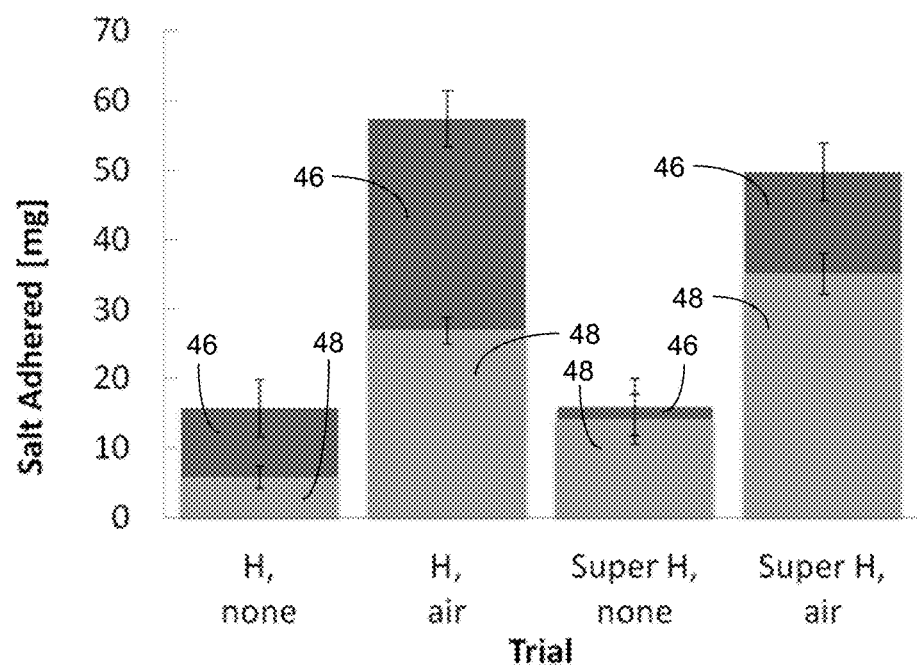
FIG. 11 is a plot of the weight of salt adhered to a petri dish MD membrane with 25% NaCl exposure, including salt from dryout 46 and salt from operation 48.

The introduction of air layers had significant but varied effects, depending on the foulant studied. In the case of salts, such as NaCl (in all cases) and $CaSO_4$ (with a less hydrophobic membrane), air layers worsened fouling, increasing the amount of mass left on the membrane, as shown in FIGS. 10, 11, and 14. However, biofouling, studied with alginate and calcium ions (a common gel-like component of seawater RO biofilms), was subject to the opposite effect. The air layers reduced biofouling by as much as 97%, as shown in FIG. 16. The introduction of air layers also reduced fouling for superhydrophobic membranes paired with calcium sulfate and colloidal silica, as shown in FIGS. 14 and 15. The probable explanation for these differences is two competing mechanisms, one that worsens fouling in the case of salts only and another that hinders fouling. The following two mechanisms were examined for the cause of increased fouling: evaporation of water into the air, which leaves crystals behind, and nucleation caused by the presence of air layers. Comparison tests between air sub-saturated and saturated with vapor yielded the same results, indicating that evaporation was, at the very least, not the dominant mechanism. Nucleation thermodynamics indicate that the air-water interface encourages nucleation more than hydrophobic microporous membranes do. Furthermore, significant experiments in the literature have shown the presence of air interfaces encourage nucleation. Nucleation is the initial and typically limiting step for inorganic scaling and does not describe gel formation of alginate biofilms.

The presence of air layers reduces the membrane area in contact with the solution, preventing fouling on hydrophobic and especially superhydrophobic surfaces [see H. Zhang, et al., "Engineering nanoscale roughness on hydrophobic surface-preliminary assessment of fouling behaviour," 6 Science and Technology of Advanced Materials 236-239 (2005)]. These results indicate that maintaining air layers on MD membranes can dramatically reduce biofouling, but with varied and usually detrimental results in terms of preventing inorganic scale. This suggests that studies from the literature encouraging air bubbling to reduce fouling by concentration polarization reduction [see G. Chen, et al., "Performance enhancement and scaling control with gas bubbling in direct contact membrane distillation," 308 Desalination 47-55 (2013)] should be viewed warily.

Additional Discussion Re Gas (Air) Backwashing

Figure 17:
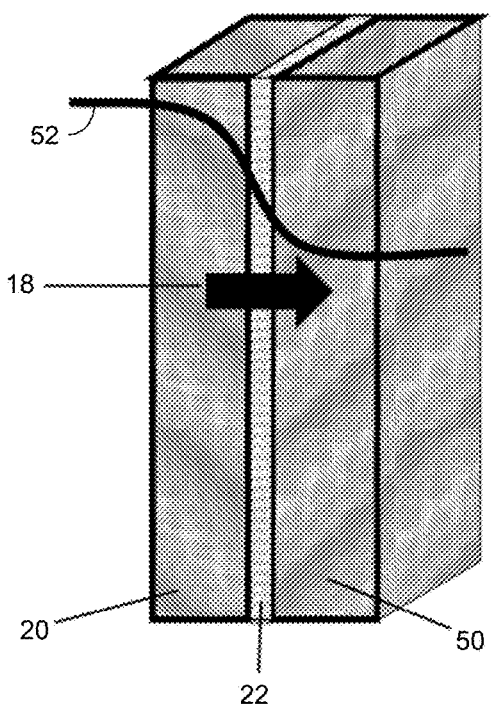
FIG. 17 is a schematic drawing of a hydrophobic separation membrane 22 in operation.

Backwashing through a hydrophobic membrane 22 for separation, usually of volatile components, is shown in FIG. 17, where the ordinary flow direction through the membrane 22 is shown via arrow 18 from the feed solution 20 to the permeate solution 50. The driving force 52 (e.g., temperature) of transport across the membrane is schematically plotted.

Supply of Gas

Figure 18:
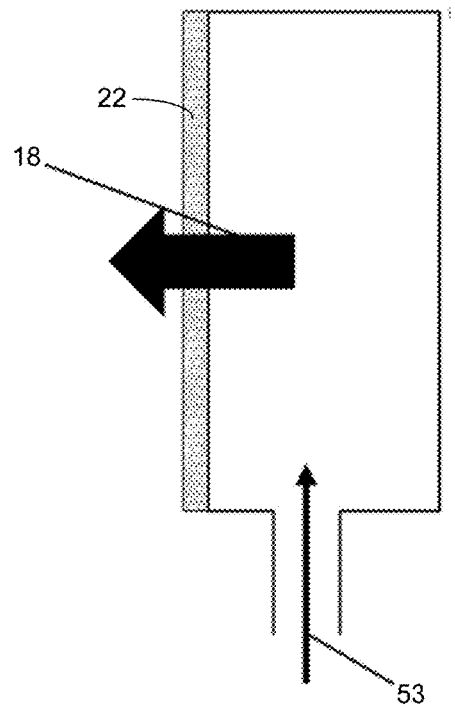
FIG. 18 illustrates backwashing of an MD membrane 22 with high-pressure air on the permeate side of the membrane.
Figure 20:
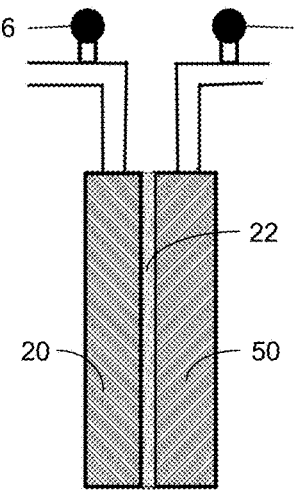
FIG. 20 illustrates the introduction of air into a MD system and the release of air via release valves 56.

There are numerous ways that gas (e.g., air) can be supplied, as shown by arrow 53 in FIG. 18, for backwashing of the membranes 22. For example, air can be supplied by pressurized air tanks, where opening a valve 56, as shown in FIG. 20, exposes the flow to a high pressure loop or chamber and purges the system. Alternatively, high pressure pumps can be used to push or pull atmospheric air (or other gas) through the membrane. For example, a bellows-type system can be used to push a fixed volume of gas through the membrane. Gas can also be forced through the membrane using centripetal force provided by spinning the membrane module. Nitrogen or carbon dioxide can alternatively be used in any of these implementations in place of air.

Figure 19:
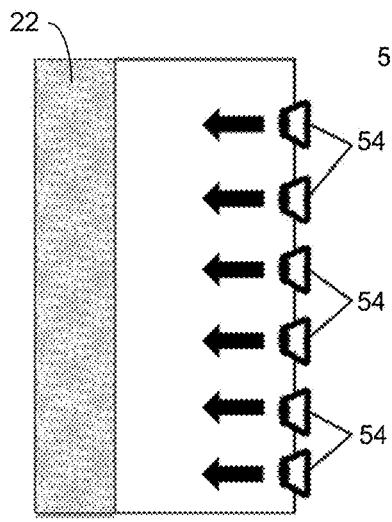
FIG. 19 illustrates the use of small nozzles 54 distributed across from the permeate side of the membrane 22 to inject air through the membrane 22.
Figure 21:
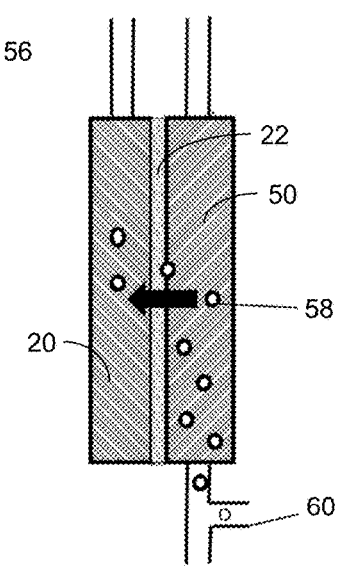
FIG. 21 illustrates the introduction of air for backwashing of a porous membrane 22 via the injection of bubbles 58 from conduit 60 into the permeate channel 50.

The supply of gas for backwashing can be provided in several ways. First, the entire permeate channel 50 can be pressurized by a gas input that can originate outside the system. The gas input be a single input and can use the same flow channels as the chamber to be pressurized. These channels can be redirected to the air side with valves. Alternatively, the system can use many small nozzles 54 (as shown in FIG. 19), holes, or pores to inject gas more uniformly across the membrane surface. Bubbling of high-pressure gas into the system in operation, as shown in FIG. 21 (where bubbles 58 are generated from gas supplied via conduit 60) can allow for gas backwashing without system shutdown. Spacers (e.g., formed of mesh) can help trap gas near the membrane surface to improve the effectiveness of the gas layer. Such spacers can have a spacing on the order of the capillary length of water in air (e.g., a few mm—for example, 2-5 mm) to trap air effectively.

When to Implement

Gas backwashing of a membrane can be used as a preventative measure or as a restorative measure. For prevention of fouling, gas can be injected periodically on either side of the membrane at predetermined intervals (e.g., once a day, once an hour, or once every five minutes). Gas can injected with regular time spacing or added specifically when the feed solution is expected to be more prone to fouling. This timing includes the time after a large pretreatment or cleaning steps or in the period between batch processes, such as those for biological assessment.

For restorative measures, the gas backwashing can be implemented as a result of wetting or fouling. Wetting degrades the quality of the permeate, and can be detected with measurements of pollutants in the permeate. For example, when using membrane distillation for desalination, the increase in salinity detected by a conductivity probe can detect wetting. Turbidity probes can detect wetting of pollutants for other membrane processes. Control systems can be designed to inject air whenever indicators of wetting exceed certain values.

Membrane Characteristics

Advantageously, the gas can be delivered through the membrane at equal or greater pressure than the liquid entry pressure (LEP) of the membrane. The LEP ($\Delta P$) is a function of pore size and can be expressed as follows:

$$\Delta P \leq \frac{2B\gamma}{r} \quad (3)$$

where B is a shape factor ($\leq 1$), $\gamma$ is the surface tension of the liquid (0.072 N/m for water), and r is the pore radius. The applied pressure of the gas can be set at the upper limit of this range to ensure that it fully cleans the membrane. For example, for a membrane with a pore radius of 200 nm, a pressure of 720 kPa would be ideal.

To be successful, the membrane is designed to be sufficiently robust to withstand the applied gas without compromising its integrity. The membrane is designed (e.g., with sufficient thickness or rigidity) to not plastically deform during application of the gas. Elastic deformation of the membrane, however, can be allowed. This system is also expected to be more effective for membranes with low-contact-angle hysteresis (high receding contact angle). Membranes with a high receding contact angle will not retain liquid in the pores as readily as membranes with low receding contact angles.

Pressurized Gas Details

For full abatement of deep wetting, fairly high pressure gas may be warranted for restoring the membrane. If the gas pressure exceeds the liquid entry pressure for the membrane, it will be sufficient to push out liquid that is trapped within the membrane. Therefore, pressure exceeding the liquid-entry pressure (which, for example, may be about 3 bar) can be used. However, this high pressure may damage the membrane. Lower pressures (e.g., very low, such as 0.1 bar for a membrane with an LEP of 3 bar) may be sufficient to remove liquid that is not trapped within the membrane and that can simply flow out. The method restores hydrophobicity quickly, as the trapped water can be pushed out in a matter of seconds. Full restoration of hydrophobicity usually requires drying out the membrane. This drying stage can be avoided if the pressurized gas is applied long enough to evaporate water within the membrane. This process can be modeled as diffusion near the boundary of a moving gas. Air with lower humidity can aid this process. For most membrane systems of typical membrane thickness (e.g., 20-1000 μm), this restoration can usually be accomplished in less than two minutes.

Additional Design Elements

Variable control of the pressure of the backwashing gas can be used to optimize performance. For example, the forcing pressure of the gas can start at a low value and then build gradually to a higher pressure in order to minimize the wear on the membrane.

A sensing system can be included to determine when all liquid has been cleared from the membrane. For example, use of a pressure sensor across the membrane can detect the pressure drop across the membrane during air backwashing. If the membrane is full of water, this drop can be larger than if all of the water has been cleared out.

In some applications, the centripetal force of rotating the module can be used to backwash the membrane. In one method, the system is spun sufficiently fast to force water in the membrane to its outside surface. This approach is well suited for the typical design of membrane modules, which are often in the form of cylinders.

Applications

Other applications for gas backwashing include desalination, water treatment, wastewater remediation, and food processing. These membranes can be used to filter out many things, including dirt, salts, bacteria, viruses, protozoa, fungi, and organic matter.

Other Variations

Instead of the introduction of pressurized gas (e.g., air), a vacuum can be maintained on the side where the pressure is intended to be lower; the vacuum can be created via a vacuum pump.

One design choice is whether to have a fixed-pressure or fixed-volume reservoir. Operation at a fixed pressure can be achieved with a compressed gas tank, wherein the valve of the tank is opened, and the gas flows at that pressure. Operation with a fixed volume can be achieved if there is a bellows-like structure full of the gas. At a specified time, the bellows can be emptied across the membrane.

The membrane can be heated to increase evaporation. This increase will reduce the time before the system can be used again. Notably, there is a tradeoff, as what is desired is pushing the salt or other pollutant out along with the liquid water. If the water evaporates in place, the salt, etc., stays.

If the system is used for oil-water separation, an oil can be used to push out the water, instead of using air. The oil can be mixed with air.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. An apparatus for enhanced anti-fouling of a submerged surface, the apparatus comprising:
   a bath of a feed liquid including water;
   a fouling structure in contact with the feed liquid, wherein the fouling structure has a surface with a rugosity greater than 3 in contact with the feed liquid;
   a mesh configured and positioned to trap gas bubbles at the surface of the fouling structure, wherein the mesh has a spacing of 2-5 mm between mesh elements; and
   a gas feed configured to introduce a gas into contact with the fouling structure and the feed liquid to separate the fouling structure from the feed liquid with a gas layer that is, at least in part, trapped between the mesh and the fouling structure.

2. The apparatus of claim 1, wherein the fouling structure is a porous membrane.

3. The apparatus of claim 2, wherein the porous membrane is polymeric.

4. The apparatus of claim 2, wherein the porous membrane has a superhydrophobic surface in contact with the feed liquid or gas layer.

5. The apparatus of claim 2, wherein the porous membrane comprises a polymer selected from polyvinylidene fluoride (PVDF), polytetrafluoroethylene (PTFE), and polypropylene (PP).

6. The apparatus of claim 5, wherein the porous membrane further comprises a fluoropolymer coating on the polymer.

7. The apparatus of claim 6, wherein the fluoropolymer is selected from at least one of the following:
   poly-(1H,1H,2H,2H-perfluorodecyl acrylate) (PPFDA);
   a C6 analog of PFDA; and
   polytetrafluoroethylene.

8. The apparatus of claim 1, wherein the feed liquid is a saline solution.

9. The apparatus of claim 8, wherein the feed liquid includes at least one of the following: NaCl, $CaSO_4$, silica, alginate, $CaCO_3$, MgOH, bacteria, algae, humic acid, and biological molecules.

10. The apparatus of claim 1, wherein the fouling structure includes a surface coating on an underlying structure, wherein the surface coating is in contact with the feed liquid and is more hydrophobic than the underlying structure.

11. A method for reducing fouling of membrane surfaces, comprising:
    contacting a surface of a porous membrane with a bath of feed liquid;
    introducing a gas into contact with the surface of the porous membrane in contact with the feed liquid;
    monitoring for performance decay in removing water vapor from the feed liquid through the porous membrane; and
    intermittently injecting the gas when a decline in performance is detected.

12. The method of claim 11, wherein the fouling structure is a porous membrane.

13. The method of claim 12, wherein the gas is injected into contact with the surface of the porous membrane.

14. The method of claim 13, wherein the gas is injected into the feed liquid.

15. The method of claim 12, wherein the gas is injected with sufficient pressure to push the feed liquid out of pores in the porous membrane as the gas is forced through the porous membrane.

16. The method of claim 11, where the decline in performance is detected by at least one of the following: a measurement of electrical conductivity through the feed liquid; a mass flow rate measurement in the apparatus; and a temperature reading in the apparatus.

17. The method of claim 11, wherein the gas is selected from at least one of the group including air, water vapor, nitrogen, $CO_2$, and oxygen.

18. The method of claim 11, wherein the method is performed in an application selected from the following: water purification; a heat exchanger; oil or gas separation; biological processes; medical procedures; filters; clothing; and gasification processes.

19. The method of claim 11, wherein the gas is introduced from a source selected from a pressurized gas tank, a gas pump, and a piston.

20. The method of claim 11, wherein gas feed is continuously bubbled through the feed liquid.

21. The method of claim 12, wherein the gas is injected on an opposite side of the porous membrane from the feed liquid at a pressure greater than a liquid entry pressure of the feed liquid into the membrane, wherein the gas enters pores in the membrane and pushes the feed liquid out of the pores in the porous membrane.

22. A method for reducing fouling of membrane surfaces, comprising:
    contacting a surface of a porous membrane with a bath of feed liquid;
    introducing a gas into contact with the surface of the porous membrane in contact with the feed liquid; and
    using a mesh to trap bubbles of the gas at the surface of the membrane, wherein the mesh has a spacing of 2-5 mm between mesh elements.

* * * * *